May 10, 1932.  C. C. HOWARD  1,858,087
INSECT TRAP
Filed March 20, 1931
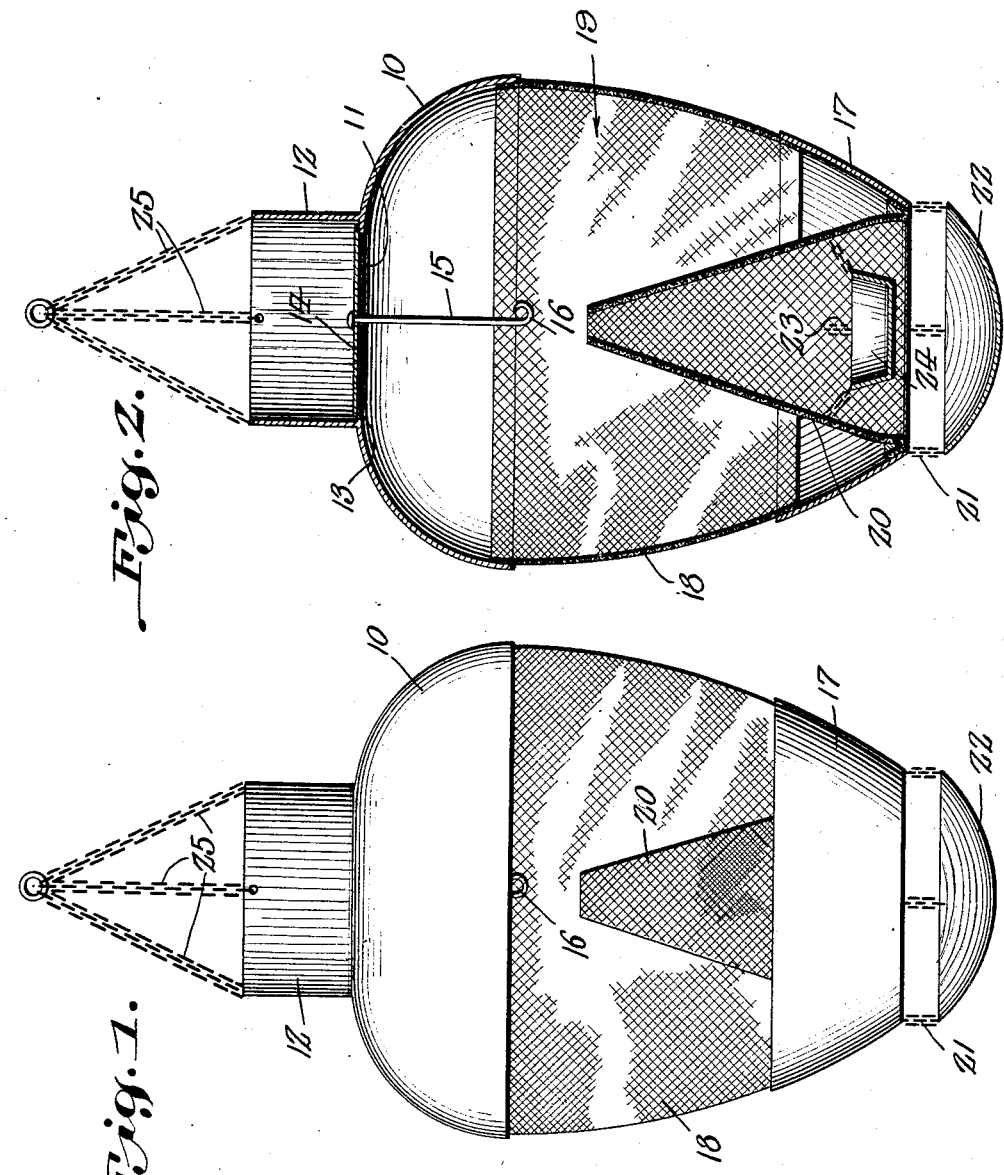
Christina C. Howard, Inventor Patented May 10, 1932

1,858,087

UNITED STATES PATENT OFFICE

CHRISTINA C. HOWARD, OF GREAT FALLS, MONTANA

INSECT TRAP

Application filed March 20, 1931. Serial No. 524,164.

This invention relates to new and useful improvements in traps, and particularly to traps for flies, and the like flying insects.

One object of the invention is to provide a device of this character which is attractive, and which will effectively trap the insects.

Another object is to provide a device of this character which is adapted to support a pot containing a growing plant.

Other objects and advantages will be apparent from the following description when taken in connection with the accompanying drawings.

In the drawings:

Figure 1 is an elevation of a combined insect trap and plant holder.

Figure 2 is a vertical longitudinal sectional view through the device.

Referring particularly to the accompanying drawings, 10 represents the upper dome-shaped metal shell portion of the trap, having a central opening 11, and the circular flange 12 rising from the opening and surrounding the same. Within the device, at the junction of the flange 12 with the dome-shaped member 10, is a flat ring 13, which supports the removable metal disk 14, and attached to the center of said disk, in pendent relation thereto, is a rod 15, having a hook 16, on its lower end for attachment of suitable bait, to attract the insects. The lower portion 17, which is also formed of metal, is in inverted truncated-cone-shape, the upper edge of which is of somewhat smaller diameter than the lower edge of the dome-shaped member 10, and extending between the member 10, and the member 17, and tapering downwardly, is a wall 18, formed from wire mesh, and which forms the surrounding wall of the trapping chamber 19. Supported at its base, on the lower end of the lower member 17, and rising upwardly within the chamber 19, is the cone member 20, also formed of wire mesh, said cone having its upper end removed to provide an escape opening for the insects to reach the trapping chamber, and which opening is disposed at a suitable distance below the bait hook 16, as is clearly shown in the drawings. Suspended below the lower end of the member 17, by the chains 21, which are attached to said member 17, is the bowl 22, which is adapted to contain bait. Suspended within the member 17, and within the lower portion of the cone member 20, by chains 23, or other suitable flexible elements, is the pan 24, which is also adapted to contain bait, such pan being arranged a short distance above the lower end of the member 17, as clearly seen in the sectional view, of the drawings.

Attached to the upper end of the cylindrical flange 12 are the chains 25, by means of which the entire device is adapted to be suspended in position to attract the insects.

It will be particularly noted that the bowl 22 is spaced at such a distance below the member 17, as to provide an opening, giving free entrance to the device, to permit the insects reaching the bait in the said bowl, and then to fly upwardly into the lower end of the conical wire member 20, whereby to reach the bait within the pan 24. The flying insects then fly upwardly into the wire cone 20, so as to reach the bait in the pan 24, after which they crawl upwardly on the inner face of the wall of said cone 20, and escape into the trapping chamber 19, through the opening in the upper end of said cone. The insects can then feed on the bait carried by the hook 16, but are prevented from escape from said trapping chamber by the disk 14, at the upper end of said chamber, and by reason of the fact that flying insects, particularly flies, do not crawl downwardly, they will not attempt to escape through the opening in the upper end of the cone 20.

The disk 14 is particularly adapted to support a flower pot, containing a growing plant, whereby to increase the ornamentality of the trap. The outer faces of the solid metal members 10 and 17 are adapted to be ornamented, as well as the bowl 22, whereby the device will be attractive, as well as useful.

By removing the disk 14, access to the bait hook 16 may be had, and by inverting the trap, the dead insects may be removed therefrom.

What is claimed is:

An insect trap comprising a suspendable structure including an open-ended upwardly flaring reticulated member, imperforate centrally apertured concavo-convex members secured to the open ends of the reticulated member in covering relation to said ends, an upwardly extending reticulated open-ended cone having its base secured within the opening of the lower of said imperforate members, a bait receptacle suspended on said lower imperforate member below the opening thereof, a bait receptacle suspended on and arranged within the lower portion of said reticulated cone, a removable cover for the opening of the upper imperforate member, and a bait holder suspended from said cover into said perforate member.

In testimony whereof, I affix my signature.

CHRISTINA C. HOWARD.